United States Patent [19]

Hensolt

[11] 4,298,432
[45] Nov. 3, 1981

[54] DEVICE FOR HOLDING GAS-COOLED FUEL ASSEMBLIES OF NUCLEAR REACTORS

[75] Inventor: Theodor Hensolt, Nuremberg, Fed. Rep. of Germany

[73] Assignee: Kraftwerk Union Aktiengesellschaft, Mulheim an der Ruhr, Fed. Rep. of Germany

[21] Appl. No.: 130,607

[22] Filed: Mar. 17, 1980

[30] Foreign Application Priority Data

Mar. 19, 1979 [DE] Fed. Rep. of Germany ....... 2910690

[51] Int. Cl.³ ................................................ G21C 3/12
[52] U.S. Cl. .................................... 376/365; 376/203; 376/352
[58] Field of Search ...................... 176/40, 50, 58, 59, 176/60

[56] References Cited

U.S. PATENT DOCUMENTS

| | | | |
|---|---|---|---|
| 3,549,493 | 12/1970 | Germer | 176/50 |
| 3,736,226 | 5/1973 | Sakurama | 176/50 |
| 3,873,419 | 3/1975 | Sletten | 176/40 |
| 3,964,969 | 6/1976 | Brynsvold et al. | 176/40 |
| 4,016,035 | 4/1977 | Gallet et al. | 176/40 |
| 4,053,354 | 10/1977 | Rennell et al. | 176/40 |
| 4,164,443 | 8/1979 | Gibbons et al. | 176/50 |

Primary Examiner—Sal Cangialosi
Attorney, Agent, or Firm—Herbert L. Lerner; Laurence A. Greenberg

[57] ABSTRACT

Device for holding jacketed fuel assemblies of a gas-cooled nuclear reactor in a grid plate disposed beneath a reactor core and formed with cylindrical bores for receiving therein a respective fuel-assembly foot which serves simultaneously as a coolant inlet, including a tubular grid-plate insert member connected respectively to each of the bores for hydraulically holding down the respective fuel assemblies against flow pressure of the coolant, the insert member being closed at the bottom thereof and having at least one lateral opening for passage of coolant to the respective fuel-assembly foot, piston rings peripherally disposed on the fuel-assembly foot above and below the lateral opening for sealing the foot with respect to the inner surface of the insert member, a plurality of wedge-like structural members uniformly distributed about the periphery of the fuel-assembly foot above the lower of the piston rings, and a piston central to the foot and actuatable by a pressure difference of the coolant between an inlet thereof to and an outlet thereof from the respective fuel element, together with a conical yet non-sealing seat of the fuel assembly formed on an upper side of the grid plate, for effecting play-free clamping of the fuel assembly.

2 Claims, 3 Drawing Figures

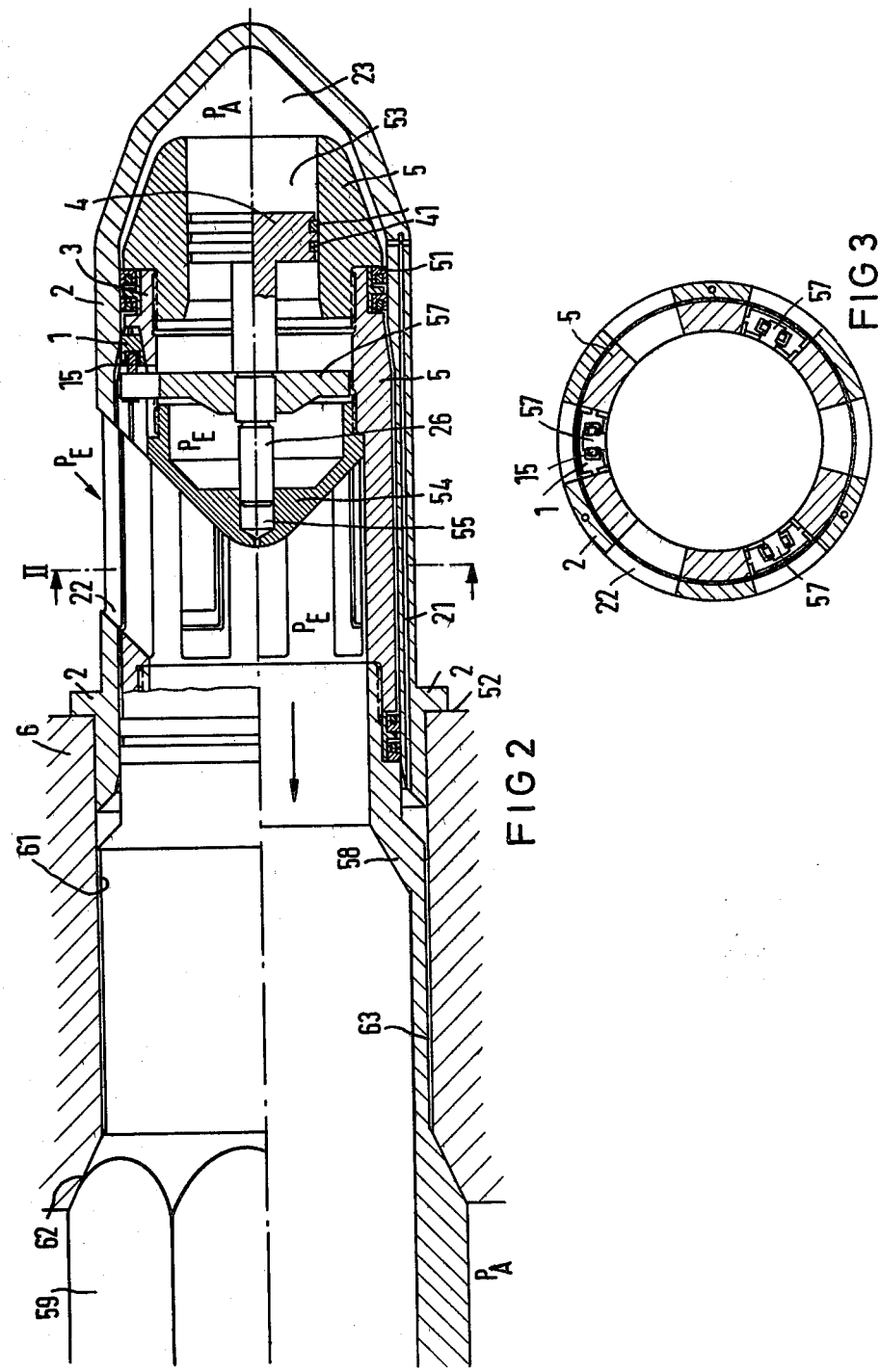

DEVICE FOR HOLDING GAS-COOLED FUEL ASSEMBLIES OF NUCLEAR REACTORS

The invention relates to a device for holding jacketed fuel assemblies of gas-cooled, especially fast, nuclear reactors in a grid plate disposed below the reactor core and formed with cylindrical bores for receiving therein a respective fuel assembly foot which also serves for admitting coolant. The fuel assemblies of such nuclear reactors generally have hexagonal cross sections, are formed of a multiplicity of fuel rods disposed in parallel, and are jacketed over the entire length thereof. The fuel-assembly jacket is attached to the foot of the fuel assembly which generally also has a transition from the hexagonal to a round cross section. With this foot, the fuel assembly is inserted into bores formed in a grid plate disposed below the reactor core, and gaseous coolant, such as helium gas, for example, flows therethrough from there, i.e. from the bottom to the top thereof. Care must be taken, in this regard, that the fuel assembly is not lifted off the seat thereof by the flow pressure of the coolant.

The individual fuel assemblies in the array or assembly of the reactor core are held by mechanical means at an exactly defined mutual spacing, the fuel assemblies disposed at the periphery being secured by a special enclosure. The removal of a fuel assembly from such an array or assembly of the reactor core presents difficulties in view of these mechanical spacer elements, especially if the nuclear reactor has already been in operation for an extended period of time, and the entire array or formation of the fuel assemblies, i.e. the rector core, is under mechanical stress due to thermal deformations. Not only the removal of a fuel assembly but also the insertion of a new one then presents difficulties. These mentioned difficulties not only complicate the operation of the reactor installation, but also impair safety, especially since damage to the fuel assemblies during fuel-assembly exchange may be unavoidable under certain conditions.

It is accordingly an object of the invention to provide a device for holding fuel assemblies of gas-cooled nuclear reactors, which dispenses with spacer means in the region of the reactor core which affords stable mounting of the fuel assemblies while they are being held down simultaneously, and requires no additional measures for removal of the fuel assemblies.

With the foregoing and other objects in view, there is provided in accordance with the invention, a device for holding jacketed fuel assemblies of a gas-cooled nuclear reactor in a grid plate disposed beneath a reactor core and formed with cylindrical bores for receiving therein a respective fuel-assembly foot which serves simultaneously as a coolant inlet, comprising a tubular grid-plate insert member connected respectively to each of the bores for hydraulically holding down the respective fuel assemblies against flow pressure of the coolant, the insert member being closed at the bottom thereof and having at least one lateral opening for passage of coolant to the respective fuel-assembly foot, piston rings peripherally disposed on the fuel-assembly foot above and below the lateral opening for sealing the foot with respect to the inner surface of the insert member, a plurality of wedge-like structural members uniformly distributed about the periphery of the fuel-assembly foot above the lower of the piston rings, and a piston central to the foot and actuatable by a pressure difference of the coolant between an inlet thereof to and an outlet thereof from the respective fuel element, together with a conical yet non-sealing seat of the fuel assembly formed on an upper side of the grid plate, for effecting playfree clamping of the fuel assembly.

In accordance with another feature of the invention, the insert member has a peripheral wall formed with an elongated bore connecting a gap, defined by the outer surface of the fuel assembly and an inner surface of the grid plate defining the respective cylindrical bore formed therein, to a space within the insert member located below the fuel-assembly foot.

Other features which are considered as characteristic for the invention are set forth in the appended claims.

Although the invention is illustrated and described herein as embodied in a device for holding gas-cooled fuel assemblies of nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is an enlarged fragmentary view of FIG. 1 showing one of the fuel elements of the reactor core in the lower grid plate of the reactor; and FIG. 3 is a cross-sectional view of FIG. 2 taken along the line II—II in direction of the arrows.

Figure 1:
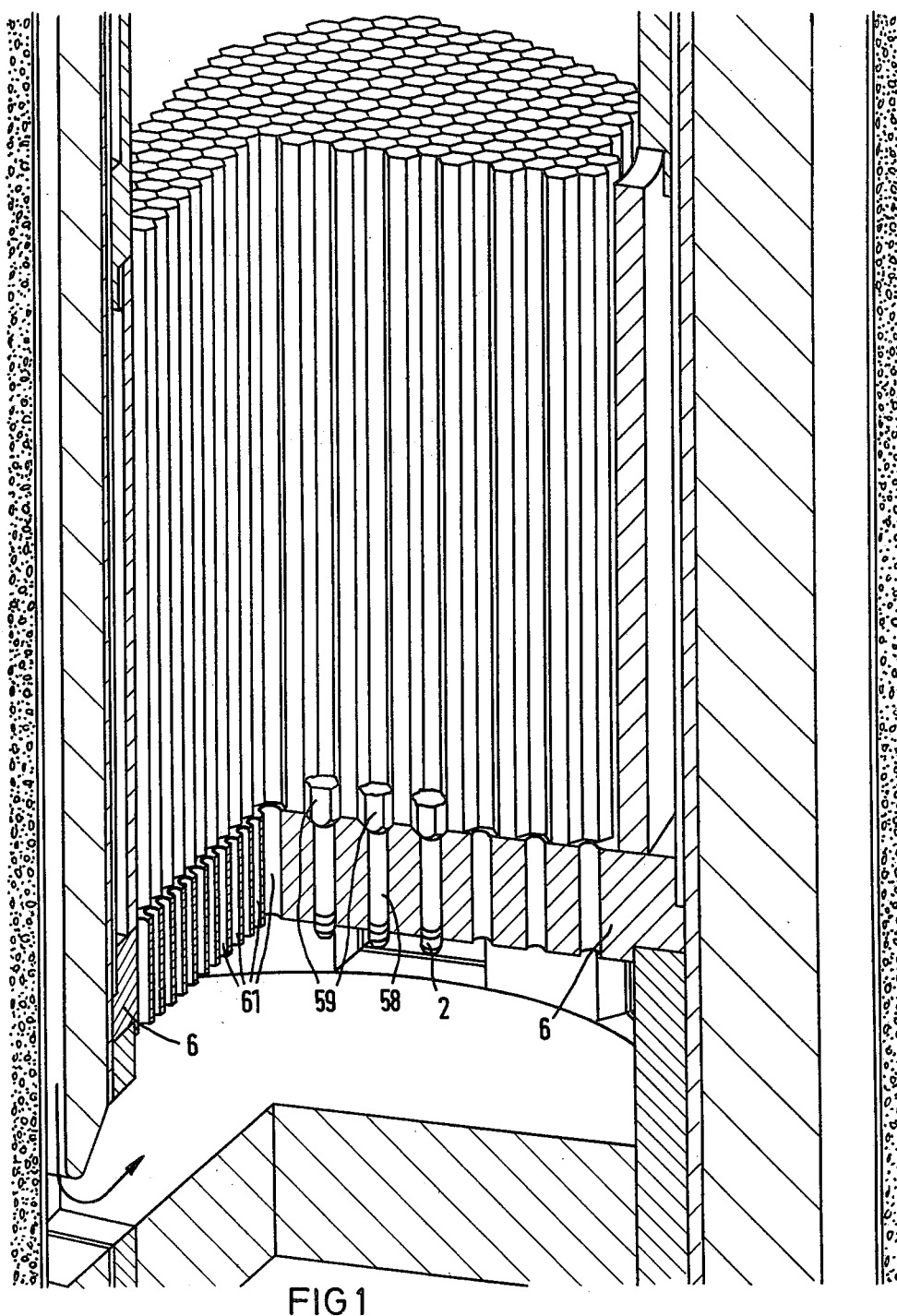
FIG. 1 is a fragmentary, partly sectional perspective view of the core of a gas-cooled fast reactor.

Referring now to the figures of the drawing, there is shown therein a multiplicity of fuel assemblies 59 which are inserted with cylindrical extensions 58 thereof into holes 61 formed in a grid plate 6 of a nuclear reactor. The foot 5 of the fuel assembly 59 is inserted into a grid plate insert member 2 which is closed off at the bottom thereof and is shown in detail in FIG. 2. Flow direction of the coolant through the reactor core from the bottom to the top thereof is represented by the arrows in FIGS. 1 and 2. The other structural members such as the surrounding pre-stressed concrete pressure tank are not further described or specifically designated since they are not important to an understanding of the invention of the instant application.

In FIG. 2, the mounting support for a fuel assembly in the lower grid plate is shown in a longitudinal sectional view of the foot 5 of a fuel assembly 59. The fuel assembly 59 has a cylindrical part 58 with a conical connecting portion by which it is seated or received in a conical enlargement 62 in the hole 61 of the grid plate 6. This conical joint is constructed so as to have no sealing effect and provides a pressure-equalizing connection between the space above the grid plate 6 and the annular gap or clearance 63 in the hole 61 formed in the grid plate 6.

As one of the most essential elements of this fuel assembly mounting, a tubular grid plate insert member 2 is then inserted into the grid plate 6 from the underside thereof and is connected thereto by positive or force locking as well as gas-tightly. This insert member 2 is closed off at the lower end thereof and, as is also apparent from FIG. 3 which represents a cross-sectional view of FIG. 2 taken along the line III-III, is provided with lateral openings 22 for passage therethrough of gaseous coolant (note the flow arrows).

The fuel assembly foot 5 per se is received in the insert member 2 which is likewise a substantially tubular structure. This foot 5 is sealed by piston rings 52 and 51 against the inner wall of the insert member 2 and is, furthermore, provided with lateral openings which are aligned or in registry with the openings 22 formed in the insert member 2, so that free entry of the coolant gas into the fuel assembly is afforded.

Since it is practically impossible to construct the fuel assembly foot 5 so that it is seated without play in the insert member 2, but the fuel assembly 59 must, nevertheless, be clamped firmly in the grid plate 6, wedge-like structural parts 1 are provided which are distributed about the periphery of the fuel-assembly base 5 and are pressed through the intermediary of movable intermediate members 15 by a yoke member 57 uniformly into the gap between the fuel-assembly foot 5 and the insert member 2. The fuel-assembly foot 5 and the insert member 2 are provided with suitable surfaces at these locations so that, thereby, firm clamping of the fuel-assembly foot 5 without play is assured. In this embodiment of the invention, three of such wedge-shaped elements 1, distributed over the periphery of the fuel-assembly foot 5, are provided (note FIG. 3, in particular).

The force required for pressing-in the wedge-shaped parts 1 results from the pressure difference of the coolant at the inlet and outlet of the fuel assembly. The inlet pressure is designated $P_E$ and the outlet pressure $P_A$. The outlet pressure $P_A$ prevails also outside the fuel assembly 59, at the upper side of the grid plate 6, as well as in the gap 63. The insert member 2 is formed with a longitudinal bore 21 which opens into the lower part 23 so that the outlet pressure $P_A$ prevails thereat, likewise. In the lower part of the foot member 5, a piston 4 is disposed in a large central bore 53 thereof and is sealed with piston rings 41 with respect to the wall of the bore 53. The crosspiece 57 is fastened to an axial rod 56 of this piston 4 and is, furthermore slidingly supported in a bore 55 formed in an end bell or bearing bracket 54. As shown, the pressure difference between the inlet pressure $P_E$ and the outlet pressure $P_A$ acts upon the piston 4 and, consequently, forces the wedges 1 into the clamping lower position. This pressure difference subsequently also has the effect of drawing the entire fuel assembly 5a with the foot 5 thereof downwardly into the insert member 2 and thereby holding it against the flow forces of the coolant.

Simultaneously with the play-free clamping of the foot 5 of the fuel assembly 5a, the latter is also held down hydraulically. Since no appreciable coolant flow exists any longer during a fuel assembly exchange, the hold-down force disappears also and the fuel assembly 5a can be withdrawn upwardly in a conventional manner from the array of the conventional fuel assemblies without previously actuating any unlocking means. Any spacer means which may have been previously provided between the fuel assembly jackets are no longer necessary in view of the play-free clamping of the fuel assembly (which represents, so-to-speak, a cantilever clamped on one side) and therefore no longer interfere with the fuel exchange operation.

In the application of the mounting principle described herein, other possible constructions are, of course, also conceivable which can be arrived at by any skilled designer without inventive effort, taking into consideration the spatial requirements or prerequisites which may possibly vary from case to case.

I claim:

1. Device for holding jacketed fuel assemblies of a gas-cooled nuclear reactor in a grid plate disposed beneath a reactor core and formed with cylindrical bores for receiving therein a respective fuel-assembly foot which serves simultaneously as a coolant inlet, comprising a tubular grid-plate insert member connected respectively to each of the bores for hydraulically holding down the respective fuel assemblies against flow pressure of the coolant, said insert member being closed at the bottom thereof and having at least one lateral opening for passage of coolant to the respective fuel-assembly foot, piston rings peripherally disposed on the fuel-assembly foot above and below said lateral opening for sealing the foot with respect to the inner surface of said insert member, a plurality of wedge-like structural members uniformly distributed about the periphery of the fuel-assembly foot above the lower of said piston rings, and a piston central to said foot and actuatable by a pressure difference of the coolant between an inlet thereof to and an outlet thereof from the respective fuel element, together with a conical yet non-sealing seat of the fuel assembly formed on an upper side of the grid plate, for effecting play-free clamping of the fuel assembly.

2. Device according to claim 1, wherein said insert member has a peripheral wall formed with an elongated bore connecting a gap, defined by the outer surface of the fuel assembly and an inner surface of the grid plate defining the respective cylindrical bore formed therein, to a space within said insert member located below the fuel-assembly foot.

* * * * *